(12) United States Patent
Shiro et al.

(10) Patent No.: US 12,378,122 B2
(45) Date of Patent: Aug. 5, 2025

(54) SURFACE-MODIFIED NANODIAMOND, NANODIAMOND DISPERSION COMPOSITION, AND SURFACE-MODIFIED NANODIAMOND PRODUCTION METHOD

(71) Applicant: DAICEL CORPORATION, Osaka (JP)

(72) Inventors: Daisuke Shiro, Tokyo (JP); Atsushi Kume, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 920 days.

(21) Appl. No.: 17/422,481

(22) PCT Filed: Feb. 10, 2020

(86) PCT No.: PCT/JP2020/005094
§ 371 (c)(1),
(2) Date: Jul. 13, 2021

(87) PCT Pub. No.: WO2020/179370
PCT Pub. Date: Sep. 10, 2020

(65) Prior Publication Data
US 2022/0064007 A1    Mar. 3, 2022

(30) Foreign Application Priority Data
Mar. 6, 2019  (JP) ................. 2019-040189

(51) Int. Cl.
*C01B 32/28* (2017.01)
*B82Y 30/00* (2011.01)
(Continued)

(52) U.S. Cl.
CPC ............... *C01B 32/28* (2017.08); *C09C 3/12* (2013.01); *B82Y 30/00* (2013.01); *B82Y 40/00* (2013.01)

(58) Field of Classification Search
CPC ......... C08K 3/04; C08K 9/06; C01P 2004/64; B82Y 30/00; B82Y 40/00; C01B 32/28; C09C 3/12
See application file for complete search history.

(56) References Cited

U.S. PATENT DOCUMENTS

2020/0017661 A1    1/2020  Umemoto
2020/0189916 A1 *  6/2020  Umemoto ............... C09C 1/565

FOREIGN PATENT DOCUMENTS

WO    WO 2018/186382 A1    10/2018
WO    WO-2018235599 A1 *   12/2018   ............. B82Y 30/00

OTHER PUBLICATIONS

Barrera et al. Colloidal dispersions of monodisperse magnetite nanoparticles modified with poly(ethylene glycol), Journal of Colloid and Interface Science 329 (2009) 107-113 (Year: 2009).*

(Continued)

*Primary Examiner* — Anthony J Zimmer
*Assistant Examiner* — Syed T Iqbal
(74) *Attorney, Agent, or Firm* — Birch, Stewart, Kolasch & Birch, LLP

(57) ABSTRACT

Provided is a polyoxyalkylene-chain surface-modified nanodiamond that is excellent in safety during production and in productivity. A surface-modified nanodiamond according to the present invention includes a nanodiamond particle and a surface-modifying group having a polyoxyalkylene chain and a silicon atom, the surface-modifying group surface-modifying the nanodiamond particle. A nanodiamond dispersion composition according to the present invention includes a dispersion medium and the surface-modified nanodiamond dispersed in the dispersion medium.

22 Claims, 1 Drawing Sheet

(51) Int. Cl.
*B82Y 40/00* (2011.01)
*C09C 3/12* (2006.01)

(56) References Cited

OTHER PUBLICATIONS

Lin et al. "Poly(ethylene glycol)-grafted silica nanoparticles for highly hydrophilic acrylic-based polyurethane coatings" Progress in Organic Coatings 106 (2017)145-154 (Year: 2017).*

Rehor et al. "Fluorescent Nanodiamonds Embedded in Biocompatible Translucent Shells" small 2014, 10, No. 6, 1106-1115 (Year: 2014).*

Terada et al. "Nanodiamonds for bioapplications-specific targeting strategies" BBA—General Subjects 1864 (2019) 129354 (Year: 2019).*

Shi et al., "Direct surface PEGylation of nanodiamond via RAFT polymerization," Applied Surface Science (2015), vol. 357, pp. 2147-2153.

Zhang et al., "PEGylation and polyPEGylation of nanodiamond," Polymer (2012), vol. 53, pp. 3178-3184.

Barrera et al., "Colloidal dispersions of monodisperse magnetite nanoparticles modified with poly(ethylene glycol)," Journal of Colloid and Interface Science, vol. 329, 2009, pp. 107-113.

Chinese Office Action and Search Report for Chinese Application No. 202080014970.0, dated Dec. 15, 2023.

Korean Office Action for Korean Application No. 10-2021-7029352, dated May 16, 2023.

Beyler-Çiğil, A. and Kahraman, M. V., "Effect of surface modification on nano-diamond particles for surface and thermal property of UV-curable hybrid coating," Progress in Organic Coatings (2016), vol. 101, pp. 468-476.

Extended European Search Report issued Dec. 5, 2012, in European Patent Application No. 20765836.0.

Lin, B. and Zhou, S., "Poly(ethylene glycol)-grafted silica nanoparticles for highly hydrophilic acrylic-based polyurethane coatings," Progress in Organic Coatings (2017), vol. 16, pp. 145-154.

Office Action issued Jan. 9, 2025, in Chinese Patent Application No. 202080014970.0.

* cited by examiner

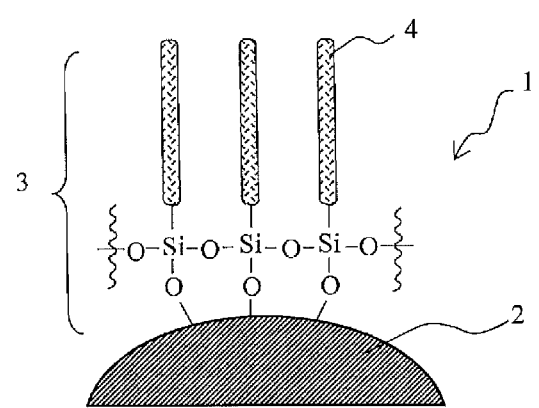

SURFACE-MODIFIED NANODIAMOND, NANODIAMOND DISPERSION COMPOSITION, AND SURFACE-MODIFIED NANODIAMOND PRODUCTION METHOD

TECHNICAL FIELD

The present invention relates to a surface-modified nanodiamond, a nanodiamond dispersion composition, and a method of producing a surface-modified nanodiamond. Particularly, the present invention relates to a surface-modified nanodiamond, a nanodiamond dispersion composition including the surface-modified nanodiamond mentioned above, and a method for producing the surface-modified nanodiamond mentioned above. The present patent application claims priority from the Japanese Patent Application No. 2019-040189, filed in Japan on Mar. 6, 2019, the contents of which are incorporated herein by reference.

BACKGROUND ART

Nano-sized fine substances are known to have novel characteristics that cannot be achieved in a bulk state. For example, nanodiamond particles (i.e., nano-sized diamond particles) exhibit mechanical strength, a high refractive index, thermal conductivity, insulating properties, antioxidation properties, and an action of promoting the crystallization of resins, and the like. However, nanodiamond particles typically have large proportions of surface atoms, a sum of van der Waals forces that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it was extremely difficult to disperse nanodiamond particles to be in a state of primary particles in an organic solvent or in a resin. Therefore, the surface of nanodiamond particles is modified so as to impart dispersibility to the nanodiamond particles to suppress aggregation.

As surface-modified nanodiamonds, for example, nanodiamonds surface-modified with polyethylene glycol chains (polyethylene glycol-chain surface-modified nanodiamonds) are known. The surface modification with polyethylene glycol chains can impart amphipathicity to the nanodiamonds.

For example, Non-Patent Literature 1 discloses a method of producing a polyethylene glycol-chain surface-modified nanodiamond by subjecting a nanodiamond having a carboxyl group on the surface to a reaction with a thionyl chloride to form acid chloride on the surface of the nanodiamond, and subjecting an alcohol or amine having a polyethylene glycol chain to a further reaction.

In addition, Non-Patent Literature 1 discloses a method of producing a nanodiamond surface-modified with poly (PEGMA) by subjecting a nanodiamond to a reaction with 2-bromoisobutyryl bromide, introducing a bromo group to the nanodiamond surface, and subjecting a polyethylene glycol methyl ether methacrylate (PEGMA) to a further reaction and polymerization.

Furthermore, Non-Patent Literature 2 discloses a method of producing a nanodiamond surface-modified with poly (PEGMA) by introducing a specific chain transfer agent into a nanodiamond surface and further reacting and polymerizing PEGMA.

CITATION LIST

Non-Patent Literature

Non-Patent Literature 1: Zhang, Xiaoyong. et al., Polymer, 53, 3178-3184:2012.

Non-Patent Literature 2: Zhang, Xiaoyong et al., Applied Surface Science 357, 2147-2153:2015.

SUMMARY OF INVENTION

Technical Problem

The reaction with thionyl chloride, disclosed in Non-Patent Literature 1, however, is dangerous. Moreover, the reaction time also tends to be long. In addition, the method of using the PEGMA, disclosed in Non-Patent Literatures 1 and 2, has difficulty in controlling the reaction because of association with the polymerization reaction. As described above, the case of producing a polyethylene glycol-chain surface-modified nanodiamond by a known method has problems such as danger and poor productivity.

Accordingly, an object of the present invention is to provide a polyoxyalkylene-chain surface-modified nanodiamond that is excellent in safety during production and in productivity. In addition, another object of the present invention is to provide a nanodiamond dispersion composition in which the surface-modified nanodiamond mentioned above is dispersed. In addition, another object of the present invention is to provide a method of producing a polyoxyalkylene-chain surface-modified nanodiamond that is excellent in safety and productivity.

Solution to Problem

The present inventors have found, as a result of diligent research for achieving the objects mentioned above, that the use of a silane coupling agent having a polyoxyalkylene chain as a polyoxyalkylene chain-containing raw material that surface-modifies a nanodiamond allows a polyoxyalkylene-chain surface-modified nanodiamond to be produced by a method that is excellent in safety during production and in productivity. The present invention was completed based on these findings.

More specifically, the present invention provides a surface-modified nanodiamond including a nanodiamond particle and a surface-modifying group having a polyoxyalkylene chain and a silicon atom, wherein the nanodiamond particle is surface-modified by the surface-modifying group.

The surface-modifying group preferably contains a urethane bond.

The polyoxyalkylene chain of the surface-modifying group preferably has a number average molecular weight of 500 or greater as a polyoxyalkylene.

The surface-modifying group is preferably one or more groups selected from the group consisting of groups represented by Formula (1), groups represented by Formula (2), and groups represented by Formula (3):

[Chem. 1]

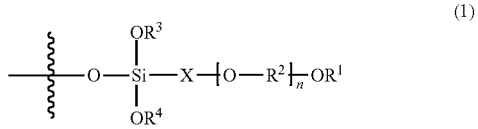
(1)

-continued

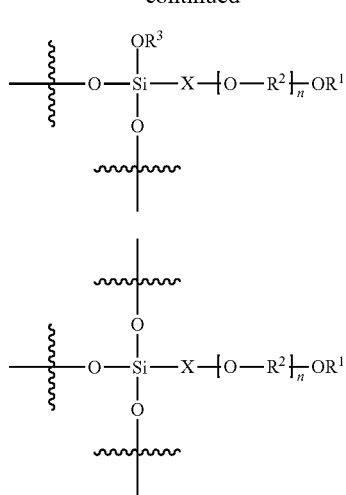

In Formulas (1) to (3), $R^1$ represents a hydrogen atom or an aliphatic hydrocarbon group. $R^2$ represents an alkylene group, and when in plural, $R^2$ may each be identical to or different. $R^3$ and $R^4$, which may be identical or different, each represent a hydrogen atom, an aliphatic hydrocarbon group having from 1 to 3 carbon atoms, or a group represented by Formula (a). X represents a single bond or a linking group. n represents an integer of 2 or greater. Bonds indicated by a wavy line in Formulas (1) to (3) bond to a surface of the nanodiamond particle:

[Chem. 2]

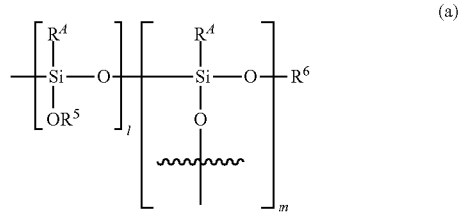

In Formula (a), $R^4$ represents [—X—(O—$R^2$)n-$OR^1$] of Formulas (1) to (3) mentioned above. $R^5$ and $R^6$, which may be identical or different, each represent a hydrogen atom or an aliphatic hydrocarbon group having from 1 to 3 carbon atoms. l and m, which may be identical or different, each represent an integer of 0 or greater. A bond extending left from a silicon atom bonds to an oxygen atom. A bond indicated by a wavy line in Formula (a) bonds to a surface of the nanodiamond particle. An order of bonding of a constituent unit indicated by l and the constituent units indicated by m is not limited. In a case where one of l and m is an integer of 1 or greater while the other is an integer of 2 or greater, the method of bonding the constituent unit indicated by l and the constituent unit indicated by m may be any of random, alternating, and block.

X mentioned above includes a urethane bond.

In addition, the present invention provides a surface-modified nanodiamond composite including the surface-modified nanodiamond mentioned above and zirconia attached to the surface-modified nanodiamond.

In addition, the present invention provides a nanodiamond dispersion composition including a dispersion medium, the surface-modified nanodiamond mentioned above being dispersed in the dispersion medium.

The nanodiamond dispersion composition mentioned above may further contain zirconia.

In addition, the present invention provides a method of producing the surface-modified nanodiamond mentioned above, the method including modifying by subjecting a nanodiamond particle to a reaction with a polyoxyalkylene chain-containing silane coupling agent.

Advantageous Effects of Invention

The surface-modified nanodiamond according to the present invention in which the polyoxyalkylene chain is surface-modified can be produced by the method that is excellent in safety during production and in productivity.

BRIEF DESCRIPTION OF DRAWINGS

FIG. 1 is an enlarged schematic diagram illustrating an example of a surface-modified nanodiamond according to an embodiment of the present invention, where the surface-modified ND [1] has a surface-modifying group [3] including a polyoxyalkylene chain-containing group [4] on the surface of a ND particle [2] (shown partially).

DESCRIPTION OF EMBODIMENTS

Surface-Modified Nanodiamond

A surface-modified nanodiamond according to an embodiment of the present invention (hereinafter, a nanodiamond may be referred to as "ND") includes nanodiamond particles and a surface-modifying group having a polyoxyalkylene chain and a silicon atoms, the surface-modifying group surface-modifying the nanodiamond particle. It is noted that, in this specification, the above-mentioned group having a polyoxyalkylene chain and a silicon atom may be referred to as a "surface-modifying group according to an embodiment of the present invention". The surface modified ND according to an embodiment of the present invention may have only one type of surface-modifying groups according to the present invention, or may have two or more types thereof.

FIG. 1 is an enlarged schematic diagram illustrating an example of a surface-modified ND according to an embodiment of the present invention, where the surface-modified ND [1] has a surface-modifying group (a surface-modifying group according to an embodiment of the present invention) [3] including a polyoxyalkylene chain-containing group [4] on the surface of a ND particle [2].

The ND particle constituting the surface-modified ND preferably contains a primary particle of the nanodiamond. In addition, a secondary particle in which several to dozens of the primary particles aggregated (agglutinated) may be included. Furthermore, the surface of the surface-modified ND may have one or more of other surface functional groups (e.g., an amino group, a hydroxyl group, and a carboxyl group) besides the surface-modifying group according to an embodiment of the present invention.

As the ND particles mentioned above, for example, detonation ND (i.e., ND produced by detonation method) and high temperature and high pressure method ND (i.e., ND produced by a high temperature and high pressure method) can be used.

Above all, from the viewpoint of superior dispersibility in the dispersion medium, i.e., from the viewpoint of making the particle diameter of the primary particle be in a single-digit nanometer, a detonation ND is preferred.

The detonation ND mentioned above includes air-cooling detonation ND (i.e., ND produced by an air-cooling detonation method) and water-cooling detonation ND (i.e., ND produced by a water-cooling detonation method). Above all, the air-cooling detonation ND is preferred from the viewpoint of obtaining smaller primary particles compared to the case of the water-cooling detonation ND.

The surface-modifying group according to an embodiment of the present invention is a group having a polyoxyalkylene chain and a silicon atom. In the surface-modifying group according to an embodiment of the present invention, the silicon atom mentioned above is preferably present between the polyoxyalkylene chain and the ND particle to be surface-modified. The silicon atom mentioned above is preferably present as a Si—O bond in the surface-modifying group according to an embodiment of the present invention. The surface-modified ND according to an embodiment of the present invention preferably has a structure where the silicon atom 0 in the surface-modifying group according to an embodiment of the present invention is bonded to the ND particle with an oxygen atom interposed therebetween.

Examples of the polyoxyalkylene chain mentioned above include a polyethylene glycol chain, a polypropylene glycol chain, a polytetramethylene glycol chain, and a polybutylene glycol chain. Furthermore, in each surface-modifying group according to an embodiment of the present invention, the polyoxyalkylene chain may be composed of only one type of oxyalkylene, or composed of two or more types of oxyalkylenes. Examples of the polyoxyalkylene chain composed of two or more oxyalkylenes include a polyethylene glycol-polypropylene glycol chain. In a case where the surface-modifying group according to an embodiment of the present invention is composed of two or more oxyalkylenes, the bonded form of the two or more oxyalkylenes may be a random, alternating, or block form.

The surface-modifying group according to an embodiment of the present invention preferably has a structure where a terminal of the polyoxyalkylene chain is sealed with an aliphatic hydrocarbon group. More specifically, the hydrogen atom in the hydroxyl group at one of the terminals of the polyoxyalkylene chain is preferably substituted with an aliphatic hydrocarbon group.

The aliphatic hydrocarbon group with which the terminal of the polyoxyalkylene chain is ended is preferably an aliphatic hydrocarbon group having from 1 to 10 carbon atoms, more preferably an aliphatic hydrocarbon group having from 1 to 6 carbon atoms. Examples of the aliphatic hydrocarbon group having from 1 to 10 carbon atoms include linear or branched alkyl groups, such as a methyl group, an ethyl group, a propyl group, an isopropyl group, a butyl group, an isobutyl group, an s-butyl group, a t-butyl group, a pentyl group, a hexyl group, a heptyl group, an octyl group, a 2-ethylhexyl group, and a decyl group; linear or branched alkenyl groups, such as vinyl and allyl groups; and alkynyl groups, such as an ethynyl group and a propynyl group. Among the groups, the linear or branched alkyl groups are preferred.

The polyoxyalkylene chain in the surface-modifying group according to an embodiment of the present invention is, in number average molecular weight as a polyoxyalkylene, preferably 100 or greater (e.g., from 100 to 10000), more preferably 200 or greater (e.g., from 200 to 5000), even more preferably 300 or greater (e.g., from 300 to 4000), even more preferably 400 or greater (e.g., from 400 to 2500), particularly preferably 500 or greater (e.g., from 500 to 3000).

The average degree of polymerization (number-average degree of polymerization) of the oxyalkylene groups in the polyoxyalkylene chain is preferably from 2 to 50, more preferably from 4 to 45, even more preferably from 6 to 40. When the average degree of polymerization is 2 or greater, the steric hindrance between the surface-modifying groups according to an embodiment of the present invention is sufficient, and dispersion in the dispersion medium is facilitated. When n is 50 or less, the surface-modifying groups according to an embodiment of the present invention is kept from being entangled, and dispersion in the dispersion medium is facilitated. In addition, properties as a diamond material are less likely to be impaired.

The surface-modifying group according to an embodiment of the present invention preferably includes a urethane bond. The urethane bond mentioned above is preferably included between the silicon atom and the polyoxyalkylene chain in the surface-modifying group according to an embodiment of the present invention.

The surface-modifying group according to an embodiment of the present invention is preferably one or more groups selected from the group consisting of groups represented by Formula (1) below, groups represented by Formula (2) below, and groups represented by Formula (3) below. The bonds indicated by wavy lines in Formulas (1) to (3) below bond to the surfaces of the nanodiamond particles.

[Chem. 3]

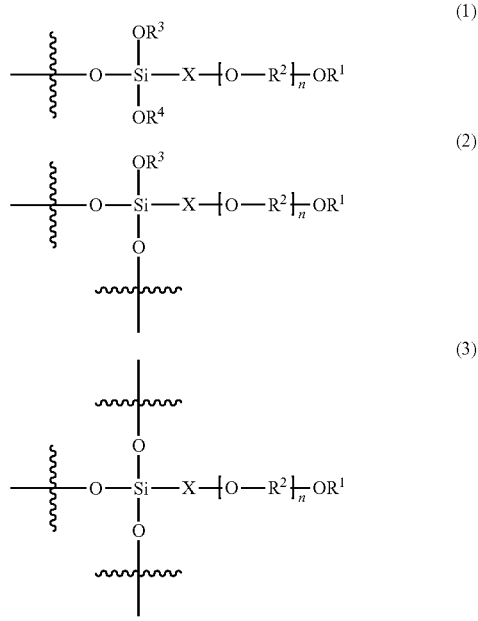

In Formulas (1) to (3) mentioned above, $R^1$ represents a hydrogen atom or an aliphatic hydrocarbon group. The aliphatic hydrocarbon group mentioned above is preferably an aliphatic hydrocarbon group having from 1 to 10 carbon atoms, more preferably an aliphatic hydrocarbon group having from 1 to 6 carbon atoms. Examples of the aliphatic hydrocarbon group having from 1 to 10 carbon atoms include linear or branched alkyl groups, such as a methyl group, an ethyl group, a propyl group, an isopropyl group, a butyl group, an isobutyl group, an s-butyl group, a t-butyl group, a pentyl group, a hexyl group, a heptyl group, an octyl group, a 2-ethylhexyl group, and a decyl group; linear or branched alkenyl groups, such as vinyl and allyl groups; and alkynyl groups, such as an ethynyl group and a propynyl group. Among these groups, the linear or branched alkyl groups are preferred.

In Formulas (1) to (3) mentioned above, $R^2$ represents an alkylene group, and is preferably an alkylene group having from 1 to 4 carbon atoms. Examples of the alkylene group having from 1 to 4 carbon atoms include an ethylene group, an isopropylene group, an isobutylene group, and a tetramethylene group. Above all, an ethylene group and an isopropylene group are preferred. A plurality of $R^2$ may each be identical or different. In the case of a plurality of $R^2$ being different, the bonded form of the oxyalkylene chains (—O—$R^2$) mentioned above may be a random, alternating, or block form.

In Formulas (1) to (3) mentioned above, n represents an average degree of polymerization (number average degree of polymerization) of the oxyalkylene chains (—O—$R^2$), and is an integer of 2 or greater. n is preferably an integer from 2 to 50, more preferably an integer from 4 to 45, even more preferably an integer from 6 to 40. When n is 2 or greater, the steric hindrance between the surface-modifying groups according to an embodiment of the present invention is sufficient, and dispersion in the dispersion medium is facilitated. When n is 50 or less, the surface-modifying groups according to an embodiment of the present invention is kept from being entangled, and dispersion in the dispersion medium is facilitated. In addition, properties as a diamond material are less likely to be impaired.

In Formulas (1) to (3) mentioned above, X represents a single bond or a linking group (a divalent group having one or more atoms). Examples of the linking group include a divalent hydrocarbon group, a urethane bond, a carbonyl group, an ether bond, an ester bound, a carbonate group, an amide group, and a group in which one or more of the groups and bonds are linked.

Examples of the divalent hydrocarbon group include a linear or branched alkylene group having from 1 to 18 carbon atoms and a divalent alicyclic hydrocarbon group. Examples of the linear or branched alkylene group having from 1 to 18 carbon atoms include a methylene group, a methylmethylene group, a dimethylmethylene group, an ethylene group, a propylene group, and a trimethylene group. Examples of the divalent alicyclic hydrocarbon group include cycloalkylene groups (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group. The number of carbon atoms in the divalent hydrocarbon group is preferably from 1 to 10, more preferably from 2 to 6.

The linking group in X mentioned above preferably includes, in particular, a urethane bond, and more preferably a group in which a urethane bond is linked to a divalent hydrocarbon group (in particular, a linear or branched alkylene group). Furthermore, the silicon atoms and the divalent hydrocarbon groups (in particular, linear or branched alkylene groups) in X in Formulas (1) to (3) mentioned above are preferably directly bonded. Specifically, X is preferably —$(CH_2)_k$-NH—C(=O)— (C at the left end and C at the right end are bonded respectively to the silicon atom and to O in the polyoxyalkylene chain). It is noted that in the formulas mentioned above, k represents an integer from 1 to 18, and is preferably an integer from 1 to 6, more preferably an integer from 1 to 3.

In Formula (1) mentioned above, $R^3$ and $R^4$, which may be identical or different, each represent a hydrogen atom, an aliphatic hydrocarbon group having from 1 to 3 carbon atoms, or a group represented by Formula (a) below. Examples of the above-mentioned aliphatic hydrocarbon group having from 1 to 3 carbon atoms include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among the groups, the linear or branched alkyl groups are preferred. It is noted that $R^3$ in Formula (2) is also the same as $R^3$ in Formula (1).

[Chem. 4]

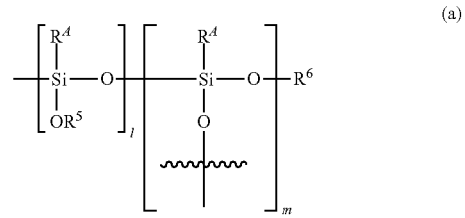

In Formula (a) mentioned above, $R^A$ represents [—X—(O—$R^2$)n-O$R^1$]. X, $R^1$, $R^2$, and n in $R^A$ are each the same as those illustrated and described in Formulas (1) to (3) mentioned above, and preferred aspects thereof are also the same. Furthermore, the bonded form in the case of having two or more of (O—$R^2$) is also as described above. It is noted that the bond extending left from the silicon atom bonds to an oxygen atom. The bond indicated by a wavy line in Formula (a) bonds to the surface of the nanodiamond particle.

In Formula (a) mentioned above, $R^5$ and $R^6$, which may be identical or different, each represent a hydrogen atom or an aliphatic hydrocarbon group having from 1 to 3 carbon atoms. Examples of the above-mentioned aliphatic hydrocarbon group having from 1 to 3 carbon atoms include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among the groups, the linear or branched alkyl groups are preferred.

In Formula (a) mentioned above, l and m, which may be identical or different, each represent an integer of 0 or greater. The order of bonding the constituent unit indicated by l and the constituent unit indicated by m is not particularly limited. More specifically, the silicon atom in Formula (a) to be bonded to an oxygen atom in Formula (1) or (2) may be a silicon atom in the constituent unit indicated by l, or may be a silicon atom in the constituent unit indicated by m. Similarly, the oxygen atom in Formula (a) to be bonded to $R^6$ in Formula (a) may be an oxygen atom in the constituent unit indicated by l, or may be an oxygen atom in the constituent unit indicated by m. In addition, in a case where one of l and m is an integer of 1 or greater while the other is an integer of 2 or greater, the bonded form of the constituent unit indicated by l and the constituent unit indicated by m may be any of random, alternating, and block.

In a case where the surface modified ND according to an embodiment of the present invention has multiple $R^1$ to $R^6$, X, l, m, or n, the multiple $R^1$ to $R^6$, X, l, m, and n may be identical or different.

It is noted that in Formulas (1) and (2) mentioned above, the structure in which $R^3$ and $R^4$ are hydrogen atoms indicates a structure in which an unreacted alkoxysilyl group in the surface-modifying group according to an embodiment of the present invention bonded to the ND particle is hydrolyzed, and the like. In addition, the structure in which $R^3$ and $R^4$ are aliphatic hydrocarbon groups having from 1 to 3 carbon atoms indicates a structure in which an unreacted alkoxysilyl group remains in the surface-modifying group according to an embodiment of the present invention bonded to the ND particle. In addition, the structure in which $R^3$ and $R^4$ are groups represented by Formula (a) mentioned above indicates a structure obtained by reacting an unreacted alkoxysilyl group in the surface-modifying group according to an embodiment of the present invention bonded to the ND particle and another alkoxysilyl group in the surface-modifying group according to an embodiment of the present invention bonded to the unreacted polyoxyalkylene chain-containing silane coupling agent described later and/or the ND particle by dehydration condensation, and the like.

The surface modified ND according to an embodiment of the present invention may have zirconia attached (affixed). The surface-modified nanodiamond according to an embodiment of the present invention with zirconia attached thereto may be referred to as a "surface-modified nanodiamond composite according to an embodiment of the present invention". More specifically, the surface-modified ND composite according to an embodiment of the present invention includes the surface-modified nanodiamond according to an embodiment of the present invention and zirconia attached to the surface-modified nanodiamond according to an embodiment of the present invention. It is to be note that the attached state of zirconia may be physical attachment (bonding, adhesion, or the like), may be chemical attachment (covalent bonding with the ND particle or the surface-modifying group according to an embodiment of the present invention, covalent bonding with the surface-modifying groups of the present invention, bonding by intermolecular forces, hydrogen bonding, ionic bonding, or the like), or may be both. Only one type of zirconia may be used, or two or more types of zirconia may be used.

The surface-modified ND according to an embodiment of the present invention will demonstrate amphipathicity in such a way that the surface-modifying group according to an embodiment of the present invention modifies the surfaces of the hydrophilic ND particles, thereby demonstrating affinity for both water and organic solvents, or achieves the dispersibility with respect to various dispersion media and the affinity for the resin in such a way that the polarity of the ND particles is controlled by adjusting the branched structure of the polyoxyalkylene chain or the length of the alkylene chain. For this reason, the surface-modified ND can be used in the fields of engineering application, such as polishing agents for CMP, dresser materials, corrosion-resistant electrode plating materials for fuel cells, high-hardness surface coating layer forming materials for cutting tools and the like, and high heat-resistance and high thermal-conductivity materials. Furthermore, the surface modified ND according to an embodiment of the present invention also has excellent dispersibility under high salt conditions and is also suitable for use in medical applications.

The particle size (D50) of the surface-modified ND according to an embodiment of the present invention is, for example, 400 nm or less, preferably 300 nm or less, more preferably 100 nm or less, and even more preferably 50 nm or less. The lower limit of the particle size (D50) of the surface-modified ND is, for example, 5 nm. Furthermore, the particle size (D90) is, for example, 500 nm or less, preferably 180 nm or less, more preferably 170 nm or less. The lower limit of the particle size (D90) of the surface-modified NDs is, for example, 50 nm. A smaller particle size of the surface-modified ND is preferred from the viewpoint of achieving high transparency of the composite material described below. It is noted that the (average) particle size of the surface-modified ND can be measured by a dynamic light scattering method.

Nanodiamond Dispersion Composition

A nanodiamond dispersion composition (ND dispersion composition) according to an embodiment of the present invention includes a dispersion medium and the surface-modified ND according to an embodiment of the present invention dispersed in the dispersion medium.

The dispersion medium mentioned above is a medium for dispersing the surface-modified ND according to an embodiment of the present invention, and examples of the dispersion medium include water, organic solvents, and ionic liquids. Only one type of dispersion medium may be used, or two or more types of dispersion media may be used.

Examples of the organic solvents mentioned above include aliphatic hydrocarbon atoms, such as hexane, heptane, and octane (especially, straight-chain saturated aliphatic hydrocarbon atoms); aromatic hydrocarbon atoms, such as benzene, toluene, and xylene; alicyclic hydrocarbon atoms, such as cyclohexane and methylcyclohexane; aprotic polar solvents, such as dimethylformamide (DMF), dimethylacetamide, N-methylpyrrolidone, and dimethyl sulfoxide; halogenated hydrocarbon atoms, such as chloroform, dichloromethane, dichloroethane, carbon tetrachloride, chlorobenzene, and trifluoromethylbenzene; linear or cyclic ethers, such as diethyl ether, diisopropyl ether, dimethoxyethane, tetrahydrofuran (THF), and dioxane; esters, such as ethyl acetate and butyl acetate; linear ketones, such as methyl ethyl ketone (MEK) and methyl isobutyl ketone; and nitriles such as acetonitrile. Among these solvents, the cyclic ethers or linear ketones are preferred from the perspective of being particularly excellent in the dispersibility of the surface-modified ND according to an embodiment of the present invention, and particularly preferred are the linear ketones.

The ND dispersion composition according to an embodiment of the present invention may include zirconia. In a case where the ND dispersion composition according to an embodiment of the present invention includes zirconia, the ND dispersion composition according to an embodiment of the present invention may include the surface-modified ND according to an embodiment of the present invention and zirconia separately or as a surface-modified ND composite according to an embodiment of the present invention. Only one type of zirconia may be used, or two or more types of zirconia may be used.

The content ratio of the ND particles in the ND dispersion composition according to an embodiment of the present invention is not particularly limited, but is, for example, from 0.1 ppm by mass to 10% by mass.

The content ratio of the ND particles mentioned above can be calculated from the absorbance at 350 nm. It is noted that in a case where the content ratio of the surface-modified ND is a low concentration (for example, less than or equal to 2000 ppm by mass), a compound in which the ND particles are surface modified by high-frequency inductively-coupled plasma emission spectroscopy (ICP emission spectroscopy) can be detected, and the rate of content can be determined on the basis of the detected amount.

The content of the dispersion medium in the ND dispersion composition according to an embodiment of the present invention is, for example, from 90 to 99.9999% by mass. It is to be noted that the upper limit is 100% by mass.

The content ratio of the zirconia in the ND dispersion composition according to an embodiment of the present invention is, for example, from 0.001 to 10% by mass, preferably from 0.01 to 1.0% by mass, more preferably from 0.05 to 0.5% by mass.

The content ratio of the zirconia can be determined, based on the detected amount of Zr detected by a high-frequency inductively-coupled plasma emission spectroscopy (ICP emission spectroscopy), with the use of, as a reference, a dispersion in which the content ratio of Zr is known.

The ratio by mass [former/latter] of the zirconia to the surface-modified ND particles in the ND dispersion composition according to an embodiment of the present invention is, for example, from 0.01 to 1.0, preferably from 0.05 to 0.75, more preferably from 0.1 to 0.5. When the ratio by mass is 0.2 or greater, the effect of including zirconia can be more sufficiently produced. When the ratio by mass is 3.0 or less, the effect of the surface-modified ND particles can be more sufficiently produced.

The ND dispersion composition according to an embodiment of the present invention may include only the surface-modified ND according to an embodiment of the present invention and the dispersion medium, or may contain other components. Examples of the other components include, besides the zirconia described above, surfactants, thickeners, coupling agents, dispersants, rust inhibitors, corrosion inhibitors, freezing point depressants, anti-foaming agents, anti-wear additives, antiseptics, and colorants. The content ratio of the other components to the total amount of the ND dispersion composition according to an embodiment of the present invention is, for example, 30% by mass or less, preferably 20% by mass or less, more preferably 10% by mass or less, even more preferably 5% by mass or less, particularly preferably 1% by mass or less. Accordingly, the total content ratio of the surface-modified ND and dispersion medium to the total amount of the ND dispersion composition according to an embodiment of the present invention is, for example, 70% by mass or greater, preferably 80% by mass or greater, more preferably 90% by mass or greater, even more preferably 95% by mass or greater, particularly preferably 99% by mass or greater.

The ND dispersion composition according to an embodiment of the present invention includes the surface-modified ND according to an embodiment of the present invention in a highly dispersed state. The average particle size (D50) of the ND particles in the ND dispersion composition according to an embodiment of the present invention is, for example, 100 nm or less, preferably 60 nm or less, more preferably 50 nm or less, even more preferably 30 nm or less. The lower limit of the average dispersed particle size of the ND particles mentioned above is, for example, 10 nm.

The ND dispersion composition according to an embodiment of the present invention has a haze value of preferably 5 or less, more preferably 3 or less, even more preferably 1 or less. The ND dispersion composition according to an embodiment of the present invention is excellent in the dispersibility of the surface-modified ND according to an embodiment of the present invention, and thus capable of achieving an ND dispersion composition with the haze value mentioned above. The haze value can be measured according to JIS K 7136.

The ND dispersion composition according to an embodiment of the present invention can be preferably used, for example, as an additive to composite materials for imparting the characteristics of fine ND particles (such as, for example, mechanical strength, high refractive index, thermal conductivity, insulating properties, antioxidation properties, crystallization promoting action, and dendrite suppressing action) to a resin or the like (such as, for example, photocurable resins and thermoplastic resins). In addition, a composition obtained by adding the ND dispersion composition according to an embodiment of the present invention to a resin can be preferably used, for example, as a material such as a functional hybrid material, a thermally functional (heat resistant, heat storing, thermo-electrically conductive, heat insulating, and the like) material, a photonic material (organic EL element, LED, liquid crystal display, optical disk, and the like), a bio/biocompatible material, a coating material, a film material (such as a hard coating film for a touch screen, various displays, and the like, and a thermal barrier film), a sheet material, a screen material (such as a transmission type transparent screen), a filler material (such as fillers for heat radiation or for improving mechanical properties), a heat resistant plastic substrate material (such as a substrate for a flexible display), and a material for lithium ion batteries. Furthermore, the ND dispersion composition according to an embodiment of the present invention can also be preferably used for medical applications, and as a friction-reducing agent or a lubricant applied to a sliding part or the like of a mechanical component (such as, for example, an automobile or an aircraft).

Method for Producing Surface-Modified Nanodiamond and Nanodiamond Dispersion Composition The surface-modified ND according to an embodiment of the present invention can be produced, for example, through modifying of reacting ND particles and a polyoxyalkylene chain-containing silane coupling agent.

The ND particles that are reacted with the silane coupling agent preferably have hydroxyl groups at the surfaces. It is noted that ND particles that are not surface-modified typically have hydroxyl groups (—OH) at the surfaces. For the ND particles, only one type of ND particles may be used, or two or more types of ND particles may be used.

The polyoxyalkylene chain-containing silane coupling agent is preferably a compound represented by Formula (1') below. For polyoxyalkylene chain-containing silane coupling agent, only one silane coupling agent may be used, or two or more types of silane coupling agents may be used.

[Chem. 5]

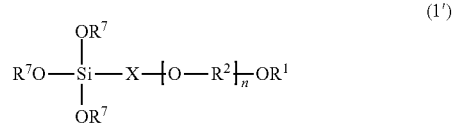

In Formula (1') mentioned above, $R^1$, $R^2$, X, and n are each the same as those illustrated and described in Formulas (1) to (3) mentioned above, and the preferred aspects thereof are also the same. In the case of using two or more of the compounds represented by Formula (1'), the multiple $R^1$, $R^2$, X, and n may be identical or different.

In Formula (1') mentioned above, $R^7$, which may be identical or different, represents an aliphatic hydrocarbon group having from 1 to 3 carbon atoms. Examples of the above-mentioned aliphatic hydrocarbon group having from 1 to 3 carbon atoms include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among the groups, the linear or branched alkyl groups are preferred.

The modifying mentioned above is preferably performed in a solvent. Examples of the solvent mentioned above include those illustrated and described as the dispersion medium mentioned above. Among these solvents, a solvent for use in the ND dispersion composition described above, a cyclic ether (e.g., THF), and a chain ketone (e.g., MEK, MIBK) are preferred. For the solvent mentioned above, only one type of solvent may be used, or two or more types of solvents may be used.

The modifying mentioned above is performed in such a way that a mixed solution containing a dried nanodiamond, a silane coupling agent, and a solvent is stirred in a reaction vessel.

In the modifying mentioned above, in a case where ND particle aggregates (agglutinates), with ND particles agglutinated to form secondary particles, are included in the ND particles, the reaction between the polyoxyalkylene chain-containing silane coupling agent and the ND particles may be developed while disintegrating or dispersing the ND particles. Thus, the ND particle aggregates can be disintegrated into primary particles, the surfaces of the ND primary particles can be modified, and the dispersibility of the ND particles can be improved.

Examples of the method for disintegrating or dispersing the ND particles include methods that process the ND particles using a high shearing mixer, a high shear mixer, a homomixer, a ball mill, a bead mill, a high pressure homogenizer, an ultrasonic homogenizer, a colloid mill, or a jet mill. Among these, implementing an ultrasonic treatment in the presence of a disintegrating medium (such as zirconia beads for example) is preferred. It is noted that the use of zirconia beads as disintegration media also, as a result, makes it possible to obtain the surface-modified ND composite according to an embodiment of the present invention and the ND dispersion composition containing zirconia. The ultrasonic treatment produces cavitation (microbubbles), and the jet blast produced at the time of breakage of the cavitation provides the disintegration media with a significantly great kinetic energy. Then, the disintegration media collides with the ND aggregates and gives impact energy to release the ND particles from the ND aggregates (disintegration). The silane coupling agent then acts on the ND particles dissociated, and bonds thereto. In a case where the ND particles includes ND agglutinates formed by agglutination of the ND particles, the ND agglutinates can be disintegrated to form primary particles, the surface of the ND primary particles can be modified, and surface-modified NDs having excellent dispersibility can be obtained.

The diameter of the disintegration medium (such as zirconia beads for example) is, for example, from 15 to 500 µm, preferably from 15 to 300 µm, and particularly preferably from 15 to 100 µm.

The ratio of the ND particles to the silane coupling agent (former:latter, ratio by mass) supplied for the reaction is, for example, 2:1 to 1:80. Furthermore, the concentration of the ND particles in the solvent is, for example, from 0.5 to 10% by mass, and the concentration of the silane coupling agent in the solvent is, for example, from 5 to 60% by mass.

The reaction time for the ND particles and the silane coupling agent is, for example, from 4 to 20 hours. Furthermore, the reaction is preferably developed while heat generated is removed with the use of ice water or the like.

As described above, the surface-modified ND according to an embodiment of the present invention, and the ND dispersion composition according to an embodiment of the present invention in which the surface-modified ND according to an embodiment of the present invention is dispersed in the dispersion medium are obtained. It is noted that, in a case where ND agglutinates remain after completion of the reaction, after the liquid formed after the completion of the reaction is left to stand, the supernatant is preferably collected and used as an ND dispersion composition. In addition, in a case where a solvent that is advantageous for the reaction for surface treatment is used in the modifying, once a dispersion of the surface-modified ND particles is obtained, the dispersion medium in the dispersion is distilled away with an evaporator or the like, after which a new dispersion medium is newly mixed and stirred. In other words, the ND dispersion composition according to an embodiment of the present invention can also be produced through a replacement of the solvent.

Note that the ND particles can be manufactured by, for example, a detonation method. Examples of the detonation method include an air-cooling detonation method and a water-cooling detonation method. Among these, the air-cooling detonation method is preferred from the viewpoint of being able to obtain ND particles having smaller primary particles compared to the case of the water-cooling detonation method.

Furthermore, the detonation may be performed in an air atmosphere, or may be performed in an inert gas atmosphere, such as a nitrogen atmosphere, an argon atmosphere, or a carbon dioxide atmosphere.

An example of the method for producing the ND particles is described below; however, the ND particles used in an embodiment of the present invention are not limited to those obtained by the following production method.

(Formation)

First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 m$^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form agglutinates.

In the formation, next, the vessel and its interior are left to stand for approximately 24 hours at room temperature, and are thereby allowed to be cooled. After the cooling, the crude product of ND particles (including the soot and agglutinates of the ND particles formed as described above) adhered to the inner wall of the vessel is scraped off with a spatula, and the crude product of ND particles is thereby collected. A crude product of ND particles (ND particle crude product) can be obtained by the method described above. Furthermore, by implementing the above-described process of forming nanodiamonds several times as necessary, a desired amount of the crude product of ND particles can be obtained.

(Acid Treatment)

In an acid treatment, a strong acid is allowed to act on the crude product of ND particles, which is a raw material, in a solvent of water for example to remove a metal oxide. The ND particle crude product obtained by the detonation method is prone to include a metal oxide, and the metal oxide is an oxide of Fe, Co, Ni, or the like resulting from the vessel or the like used in the detonation method. The metal oxide can be dissolved and removed from the ND particle crude product by allowing a strong acid to act thereon in an aqueous solvent, for example. The strong acid used in the acid treatment is preferably a mineral acid, and examples thereof include hydrochloric acid, hydrofluoric acid, sulfuric acid, nitric acid, and aqua regia. A single kind of the strong acid may be used, or two or more kinds of the strong acids may be used. The concentration of the strong acid used in the acid treatment is, for example, from 1 to 50% by mass. The acid treatment temperature is, for example, from 70 to 150° C. The duration of the acid treatment is, for example, from 0.1 to 24 hours. Furthermore, the acid treatment can be performed under reduced pressure, at atmospheric pressure, or under pressurization. After such an acid treatment, the solid content (containing the nanodiamond agglutinates) is washed with water through decantation for example. The solid is preferably repeatedly washed with water by decantation until the pH of the precipitation solution reaches, for example, 2 to 3. If the content of the metal oxide in the ND particle crude product obtained by the detonation method is small, the acid treatment as described above may be omitted.

(Oxidation Treatment)

The oxidation treatment is a process to remove graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing an oxidizing agent to act thereon in an aqueous solvent. Furthermore, by allowing the oxidizing agent to act thereon, an oxygen-containing group, such as a carboxyl group or a hydroxyl group, can be introduced onto the ND particle surface.

Examples of the oxidizing agent used in the oxidation treatment include chromic acid, chromic anhydride, dichromic acid, permanganic acid, perchloric acid, nitric acid, and mixtures thereof, a mixed acid of at least one acid selected therefrom and another acid (for example, sulfuric acid), and salts thereof. Among these, a mixed acid (in particular, a mixed acid of sulfuric acid and nitric acid) is preferably used since such a mixed acid is environmentally friendly and exhibits excellent performance in oxidizing and removing graphite.

The mixing ratio of sulfuric acid to nitric acid (the former/the latter, mass ratio) in the above-described mixed acid is preferably, for example, from 60/40 to 95/5 because when the mixing ratio is in that range, the graphite can be efficiently oxidizes and removed at, for example, a temperature of 130° C. or higher (particularly preferably 150° C. or higher, and the upper limit being 200° C., for example), even under a pressure near normal pressure (for example, from 0.5 to 2 atm). The lower limit of the mixing ratio is preferably 65/35, and more preferably 70/30. The upper limit of the mixing ratio is preferably 90/10, more preferably 85/15, and still more preferably 80/20. When the mixing ratio is not less than 60/40, the content of sulfuric acid having a high boiling point is high, and therefore the reaction temperature becomes, for example, 120° C. or higher under a pressure near that of normal pressure, and therefore, the efficiency in graphite removal tends to be improved. When the mixing ratio is less than or equal to 95/5, nitric acid that greatly contributes to oxidation of graphite is contained in a larger amount, and thus efficiency in graphite removal tends to be improved.

The usage amount of the oxidizing agent (in particular, the mixed acid) is, for example, from 10 to 50 parts by mass, preferably from 15 to 40 parts by mass, and particularly preferably from 20 to 40 parts by mass, per 1 part by mass of the ND particle crude product. In addition, the usage amount of sulfuric acid in the mixed acid is, for example, from 5 to 48 parts by mass, preferably from 10 to 35 parts by mass, and more preferably from 15 to 30 parts by mass, per 1 part by mass of the ND particle crude product. In addition, the usage amount of nitric acid in the mixed acid is, for example, from 2 to 20 parts by mass, preferably from 4 to 10 parts by mass, and more preferably from 5 to 8 parts by mass, per 1 part by mass of the ND particle crude product.

Furthermore, when the mixed acid is used as the oxidizing agent, a catalyst may be used together with the mixed acid. When the catalyst is used, the removal efficiency of graphite can be further improved. Examples of the catalyst include copper (II) carbonate. The usage amount of the catalyst is, for example, approximately from 0.01 to 10 parts by mass per 100 parts by mass of the ND particle crude product.

The oxidation treatment temperature is, for example, from 100 to 200° C. The duration of the oxidation treatment is, for example, from 1 to 24 hours. The oxidation treatment can be performed under reduced pressure, at atmospheric pressure, or under pressurization.

(Alkali and Hydrogen Peroxide Treatment)

When the metal oxide is not completely removed and remains on the ND particles even after the acid treatment described above, agglutinates (secondary particles) are formed by very strong interaction between primary particles, resulting in aggregation. In such a case, an alkali and a hydrogen peroxide may be allowed to act on the ND particles in an aqueous solvent. Consequently, the metal oxide remaining on the ND particles can be removed, and separation of the primary particles from the agglutinates can be promoted. Examples of the alkali used in this treatment include sodium hydroxide, ammonia, and potassium hydroxide. In alkali and hydrogen peroxide treatment, the concentration of the alkali is, for example, from 0.1 to 10% by mass, the concentration of hydrogen peroxide is, for example, from 1 to 15% by mass, the treatment temperature is, for example, from 40 to 100° C., and the treatment time is, for example, from 0.5 to 5 hours. Furthermore, the alkali and hydrogen peroxide treatment can be performed under reduced pressure, at atmospheric pressure, or under pressurization.

After the above oxidation treatment or alkali and hydrogen peroxide treatment, it is preferable to remove the supernatant by decantation, for example. In addition, in decantation, the solid content is preferably washed with water. The supernatant liquid from the initial washing with water is colored, and thus, the solid content is preferably repeatedly washed with water until the supernatant liquid becomes visually transparent.

(Disintegrating Treatment)

The ND particles may be subjected to a disintegrating treatment as necessary. The disintegrating treatment can be performed using, for example, a high shearing mixer, a high shear mixer, a homomixer, a ball mill, a bead mill, a high pressure homogenizer, an ultrasonic homogenizer, or a colloid mill. It is noted that the disintegration treatment may be performed by a wet process (for example, a disintegration treatment in a state of being suspended in water or the like), or may be performed by a dry process. When the disintegrating treatment is performed by a dry process, drying is preferably performed before the disintegrating treatment. Furthermore, the disintegration treatment may be, in the case of performing the oxidation treatment or the hydrogenation treatment, performed after the treatment.

(Drying)

Drying is preferably performed after the alkali and hydrogen peroxide treatment. For example, a spray drying apparatus or an evaporator, etc., is used to evaporate the liquid content from the ND particle-containing solution obtained through the alkali and hydrogen peroxide treatment, after which the resulting residual solid content is dried by being heated and dried in a drying oven. The temperature for heating and drying is, for example, from 40 to 150° C. Through such drying, ND particles are obtained.

Furthermore, as necessary, the ND particles may be subjected to an oxidation treatment (for example, oxygen oxidation) or a reduction treatment (for example, a hydrogenation treatment) in a gas phase as necessary. By performing an oxidation treatment in the gas phase, ND particles having a large amount of C=O groups on the surface are obtained. In addition, by carrying out a reduction treatment in the gas phase, ND particles having a large amount of C—H groups on the surface are produced.

EXAMPLES

Hereinafter, the present invention will be described in more detail based on examples, but the present invention is not limited by these examples.

Example 1

Surface-modified ND particles and a nanodiamond dispersion composition were produced through the following process.

(Production of Surface-Modified ND Particles)

First, the formation of nanodiamonds by a detonation method was performed. In the present formation, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Subsequently, the container and its interior were left standing for 24 hours at room temperature, and were thereby cooled. After the cooling, a nanodiamond crude product (containing the agglutinate of the ND particles and soot formed in the above detonation method, which adhered to the inner wall of the vessel, was scraped with a spatula, and the nanodiamond crude product was thereby collected.

The nanodiamond particle crude product obtained by performing the formation as described above multiple times was then subjected to an acid treatment. Specifically, a slurry obtained by adding 6 L of a 10% by mass hydrochloric acid to 200 g of the nanodiamond crude product was subjected to a heat treatment under reflux at normal pressure conditions for 1 hour. The heating temperature in this acid treatment was from 85 to 100° C. Then, after cooling, the solid (containing the nanodiamond agglutinates and soot) was washed with water by decantation. The solid was repeatedly washed with water by decantation until the pH of the precipitation solution reached 2 from the low pH side.

An oxidation treatment was then performed. Specifically, 6 L of 98% by mass sulfuric acid and 1 L of 69% by mass nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment was from 140 to 160° C. Then, after cooling, the solid (containing the nanodiamond agglutinates) was washed with water by decantation. The initial supernatant liquid from the water washing was colored, and therefore washing of the solid content with water by decantation was repeated until the supernatant liquid became visually clear.

Next, the precipitate solution (the solution containing the nanodiamond agglutinate) obtained through the water-washing treatment described above was subjected to drying to obtain a dried powder (nanodiamond agglutinate). Evaporation to dryness performed with the use of an evaporator was employed as a technique for the drying treatment in the drying.

Next, 10 mmol of a polyalkylene glycol (trade name "UNIOX M-1000", from NOF Corporation) was dissolved in 100 mL of THF, and 60 mmol of triethylamine was slowly added to the solution. Furthermore, 10 mmol of isocyanate propyltrimethoxysilane (3-(Trimethoxysilyl) propyl isocyanate) (from Tokyo Chemical Industry Co., Ltd.) was added thereto, and with a reflux tube attached thereto, the mixture was reacted under the condition of 80° C. for 48 hours. After completion of the reaction, the THF was distilled off by distillation under reduced pressure with an evaporator, and furthermore, the triethylamine was completely removed by still standing at 110° C. for 24 hours in a vacuum dryer to obtain a polyoxyalkylene chain-containing silane coupling agent ([(MeO)$_3$SiC$_3$H$_6$NHC(=O)-PEG], terminal:aliphatic hydrocarbon group, and number average molecular weight as polyoxyalkylene: 1000).

Into a reaction vessel, 0.30 g of the nanodiamond agglutinate obtained through the drying mentioned above was weighed, and 15 cc of a methyl ethyl ketone, 8 g of the polyoxyalkylene chain-containing silane coupling agent, and 15 g of zirconia balls (registered trademark "YTZ", diameter: 30 μm, from Tosoh Corporation) were added thereto. After the addition, the ND particles and the silane coupling agent were subjected to ultrasonic treatment for 15 hours using an ultrasonic dispersing machine (model "UH-600S", available from SMT Co., Ltd.) under cooling in ice water, in a condition where a tip of an oscillator of the ultrasonic dispersing machine is immersed in the solution in the reaction vessel. Thus, the nanodiamond particles and the polyoxyalkylene chain-containing silane coupling agent were reacted. The mixture was initially gray; however, the particle diameter gradually became smaller, and the dispersion state became better. Finally, the mixture became a uniform, black liquid. This is believed to be because nanodiamond particles were sequentially disintegrated from the nanodiamond aggregate (disintegration), the polyoxyalkylene chain-containing silane coupling agent acts on the nanodiamond particles dissociated and bonds to the particles, and the surface-modified nanodiamond particles are stably dispersed in the toluene solvent. The obtained dispersion was subjected to centrifugation under the condition of 13000 G for 15 minutes to obtain a supernatant. Thus, a surface-modified nanodiamond dispersion was obtained. In the surface-modified nanodiamond dispersion obtained, the median size (particle size D50) of the surface-modified nanodiamond particles, measured by the method mentioned above, was 32 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 2

Nanodiamond particles and a polyoxyalkylene chain-containing silane coupling agent were reacted by ultrasonic treatment for 15 hours in the same manner as in Example 1, except for using 8 g of the polyoxyalkylene chain-containing silane coupling agent ([(MeO)$_3$SiC$_3$H$_6$NHC(=O)-PEG], terminal:aliphatic hydrocarbon group, number average molecular weight as polyoxyalkylene: 2000) synthesized with the use of 10 mmol of trade name "UNIOX M-2000" (from NOF Corporation) instead of 10 mmol of trade name "UNIOX M-1000" (from NOF Corporation) used in the modifying of Example 1, and using 15 cc of tetrahydrofuran instead of 15 cc of methyl ethyl ketone. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 80 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 3

Nanodiamond particles and a polyoxyalkylene chain-containing silane coupling agent were reacted by ultrasonic treatment for 15 hours in the same manner as in Example 1, except for using 4 g of the polyoxyalkylene chain-containing silane coupling agent ([(MeO)$_3$SiC$_3$H$_6$NHC(=O)-PPG], terminal:aliphatic hydrocarbon group, number average molecular weight as polyoxyalkylene: 700) synthesized with the use of 10 mmol of trade name "UNILUBE MB-7" (from NOF Corporation) instead of 10 mmol of trade name "UNIOX M-1000" (from NOF Corporation) used in the modifying of Example 1. After the ultrasonic treatment for 15 hours, the obtained dispersion was subjected to centrifugation under the condition of 13000 G for 15 minutes to obtain a supernatant. The median size (particle size D50) of the surface-modified nanodiamond particles measured by the above method after the 15-hour ultrasonication was 35 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 4

Nanodiamond particles and a polyoxyalkylene chain-containing silane coupling agent were reacted by ultrasonic treatment for 15 hours in the same manner as in Example 1, except for using 4 g of the polyoxyalkylene chain-containing silane coupling agent ([(MeO)$_3$SiC$_3$H$_6$NHC(=O)-PPG], terminal:aliphatic hydrocarbon group, number average molecular weight as polyoxyalkylene: 1000) synthesized with the use of 10 mmol of trade name "UNILUBE MB-11" (from NOF Corporation) instead of 10 mmol of trade name "UNIOX M-1000" (from NOF Corporation) used in the modifying of Example 1. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 104 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 5

Nanodiamond particles and a polyoxyalkylene chain-containing silane coupling agent were reacted by ultrasonic treatment for 15 hours in the same manner as in Example 1, except for using 8 g of the polyoxyalkylene chain-containing silane coupling agent ([(MeO)$_3$SiC$_3$H$_6$NHC(=O)-PPG], terminal:aliphatic hydrocarbon group, number average molecular weight as polyoxyalkylene: 2300) synthesized with the use of 10 mmol of trade name "UNILUBE MB-370" (from NOF Corporation) instead of 10 mmol of trade name "UNIOX M-1000" (from NOF Corporation) used in the modifying of Example 1, and using 15 cc of tetrahydrofuran instead of 15 cc of methyl ethyl ketone. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 328 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 6

Nanodiamond particles and a polyoxyalkylene chain-containing silane coupling agent were reacted by ultrasonic treatment for 15 hours in the same manner as in Example 1, except for using 8 g of the polyoxyalkylene chain-containing silane coupling agent ([(MeO)$_3$SiC$_3$H$_6$NHC($=$O)-PPG-PEG], terminal:aliphatic hydrocarbon group, number average molecular weight as polyoxyalkylene: 550, bonded form of PPG and PEG:block) synthesized with the use of 10 mmol of trade name "UNIOX M-550" (from NOF Corporation) instead of 10 mmol of trade name "UNIOX M-1000" (from NOF Corporation) used in the modifying of Example 1, and using 15 cc of tetrahydrofuran instead of 15 cc of methyl ethyl ketone. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 48 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 7

Nanodiamond particles and a polyoxyalkylene chain-containing silane coupling agent were reacted by ultrasonic treatment for 15 hours in the same manner as in Example 1, except for using 4 g of the polyoxyalkylene chain-containing silane coupling agent ([(MeO)$_3$SiC$_3$H$_6$NHC($=$O)-PPG-PEG], terminal:aliphatic hydrocarbon group, number average molecular weight as polyoxyalkylene: 1000, bonded form of PPG and PEG:block) synthesized with the use of 10 mmol of trade name "UNILUBE 50 MB-11" (from NOF Corporation) instead of 10 mmol of trade name "UNIOX M-1000" (from NOF Corporation) used in the modifying of Example 1. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 63 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to successfully confirm a favorable dispersion state kept.

Example 8

Nanodiamond particles and a polyoxyalkylene chain-containing silane coupling agent were reacted by ultrasonic treatment for 15 hours in the same manner as in Example 1, except for using 3 g of trade name "Dynasylan 4150" (from Evonik Industries, [(MeO)$_3$SiC$_3$H$_6$-PEG], terminal:aliphatic hydrocarbon group, number average molecular weight as polyoxyalkylene: 500) instead of 8 g of the polyoxyalkylene chain-containing silane coupling agent used in the Example 1, and using 15 cc of tetrahydrofuran instead of 15 cc of methyl ethyl ketone. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 140 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to find a favorable dispersion state to be kept. Also in a case where N-methylpyrrolidone was used instead of acetonitrile, the same operation was performed to confirm ND particles aggregated and precipitated.

Comparative Example 1

Nanodiamond particles and an alkyl chain-containing silane coupling agent were reacted by ultrasonic treatment for 15 hours in the same manner as in Example 1, except for using 1.2 g of hexyltrimethoxysilane instead of 8 g of the polyoxyalkylene chain-containing silane coupling agent used in the Example 1, and using 15 cc of tetrahydrofuran instead of 15 cc of methyl ethyl ketone. After the ultrasonic treatment for 15 hours, the obtained dispersion was subjected to centrifugation under the condition of 13000 G for 15 minutes to obtain a supernatant. The median size (particle size D50) of the surface-modified nanodiamond particles, measured by the method mentioned above, was 21 nm.

Subsequently, after adding 5 mL of acetonitrile to 1 ml of the surface-modified nanodiamond dispersion obtained, the mixture was stirred for 5 minutes in an ultrasonic cleaner, and the appearance after still standing for one day was observed to confirm ND particles aggregated and precipitated. Also in a case where N-methylpyrrolidone was used instead of acetonitrile, the same operation was performed to confirm ND particles aggregated and precipitated.

Particle Diameter D50

The median sizes (particle sizes D50) of the nanodiamond dispersions according to the examples and comparative examples, obtained in the manners described above, were measured from the nanodiamond particle size distributions obtained by a dynamic light scattering method. Specifically, the nanodiamond particle size distributions were measured by a dynamic light scattering method (non-contact backscattering method) with the use of an instrument (trade name "Zetasizer Nano ZS") available from Malvern Panalytical Ltd.

To summarize the above, configurations of the present invention and variations thereof will be described below.

[Appendix 1] A surface-modified nanodiamond including a nanodiamond particle and a surface-modifying group having a polyoxyalkylene chain and a silicon atom, in which the nanodiamond particle is surface-modified by the surface-modifying group.

[Appendix 2] The surface-modified nanodiamond according to Appendix 1, in which the silicon atom is present as a Si—O bond in the surface-modifying group.

[Appendix 3] The surface-modified nanodiamond according to Appendix 1 or 2, in which the silicon atom has a structure bonded to the nanodiamond particle with an oxygen atom interposed therebetween.

[Appendix 4] The surface-modified nanodiamond according to any one of Appendixes 1 to 3, in which the polyoxyalkylene chain includes one or more selected from the group consisting of a polyethylene glycol chain, a polypropylene glycol chain, a polytetramethylene glycol chain, and a polybutylene glycol chain.

[Appendix 5] The surface-modified nanodiamond according to any one of Appendixes 1 to 4, in which the surface-modifying group has a structure with an terminal of the polyoxyalkylene chain ended with an aliphatic hydrocarbon group.

[Appendix 6] The surface-modified nanodiamond according to Appendix 5, in which the aliphatic hydrocarbon group is an aliphatic hydrocarbon group having from 1 to 10 carbon atoms (preferably an aliphatic hydrocarbon group having from 1 to 6 carbon atoms, more preferably a linear or branched chain alkyl group).

[Appendix 7] The surface-modified nanodiamond according to any one of Appendixes 1 to 6, in which the surface-modifying group includes a urethane bond.

[Appendix 8] The surface-modified nanodiamond according to Appendix 7, having the urethane bond between the silicon atom and the polyoxyalkylene chain in the surface-modifying group.

[Appendix 9] The surface-modified nanodiamond according to any one of Appendixes 1 to 8, in which the polyoxyalkylene chain in the surface-modifying group has, as a polyoxyalkylene, a number average molecular weight of 100 or greater (e.g., from 100 to 10000}, preferably 200 or greater (e.g., from 200 to 5000), more preferably 300 or greater (e.g., from 300 to 4000), even more preferably 400 or greater (e.g., from 400 to 2500), particularly preferably 500 or greater (e.g., from 500 to 3000).

[Appendix 10] The surface-modified nanodiamond according to any one of Appendixes 1 to 9, in which an average degree of polymerization (number average degree of polymerization) of oxyalkylene groups in the polyoxyalkylene chain is from 2 to 50 (preferably from 4 to 45, more preferably from 6 to 40).

[Appendix 11] The surface-modified nanodiamond according to any one of Appendixes 1 to 10, in which the surface-modifying group is one or more groups selected from the group consisting of groups represented by Formula (1), groups represented by Formula (2), and groups represented by Formula (3):

[Chem. 1]

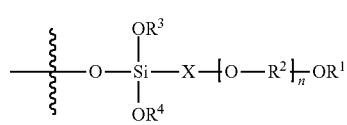

(1)

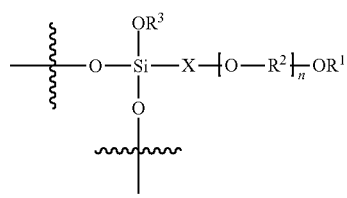

(2)

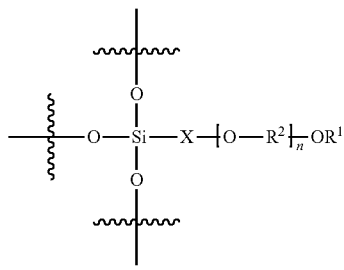

(3)

where in Formulas (1) to (3), $R^1$ represents a hydrogen atom or an aliphatic hydrocarbon group,
$R^2$ represents an alkylene group, and when in plural, $R^2$ may each be identical to or different,
$R^3$ and $R^4$, which may be identical or different, each represent a hydrogen atom, an aliphatic hydrocarbon group having from 1 to 3 carbon atoms, or a group represented by Formula (a) below,
X represents a single bond or a linking group,
n represents an integer of 2 or greater,
bonds indicated by a wavy line in Formulas (1) to (3) bond to the surface of the nanodiamond particle:

[Chem. 2]

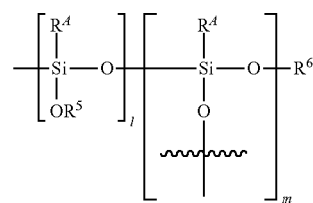

(a)

where in Formula (a), $R^A$ represents [—X—(O—$R^2$)n-$OR^1$] in Formulas (1) to (3) mentioned above,
$R^5$ and $R^6$, which may be identical or different, each represent a hydrogen atom or an aliphatic hydrocarbon group having from 1 to 3 carbon atoms,
l and m, which may be identical or different, each represent an integer of 0 or greater,
a bond extending left from a silicon atom bonds to an oxygen atom,
a bond indicated by a wavy line in Formula (a) bonds to a surface of the nanodiamond particle,
an order of bonding of a constituent unit indicated by l and the constituent unit indicated by m is not limited,
in a case where one of l and m is an integer of 1 or greater while the other is an integer of 2 or greater, the method of bonding for the constituent unit indicated by l and the constituent unit indicated by m may be any of random, alternating, and block.

[Appendix 12] The surface-modified nanodiamond according to Appendix 11, in which X mentioned above includes a urethane bond.

[Appendix 13] The surface-modified nanodiamond according to any one of Appendixes 1 to 12, in which the nanodiamond particle includes a nanodiamond obtained by a detonation method (preferably, a nanodiamond obtained by an air-cooling detonation method).

[Appendix 14] The surface-modified nanodiamond according to any one of Appendixes 1 to 13, in which a particle size (D50) is 400 nm or less (preferably 300 nm or less, more preferably 100 nm or less, even more preferably 50 nm or less).

[Appendix 15] The surface-modified nanodiamond according to any one of Appendixes 1 to 14, in which a particle size (D90) is 500 nm or less (preferably 180 nm or less, more preferably 170 nm or less).

[Appendix 16] A surface-modified nanodiamond composite including the surface-modified nanodiamond described in any one of Appendixes 1 to 15 and zirconia attached to the surface-modified nanodiamond.

[Appendix 17] A nanodiamond dispersion composite including a dispersion medium and the surface-modified nanodiamond described in any one of Appendixes 1 to 15, the surface-modified nanodiamond being dispersed in the dispersion medium.

[Appendix 18] The nanodiamond dispersion composition according to Appendix 17, further including zirconia.

[Appendix 19] A method of producing the surface-modified nanodiamond described in any one of Appendixes 1 to 15, the method including modifying by subjecting a nanodiamond particle to a reaction with a polyoxyalkylene chain-containing silane coupling agent.

REFERENCE SIGNS LIST

1 Surface-modified nanodiamond
2 Nanodiamond particle
3 Surface-modifying group according to an embodiment of present invention
4 Polyoxyalkylene chain-containing group

The invention claimed is:

1. A surface-modified nanodiamond comprising a nanodiamond particle and a surface-modifying group having a polyoxyalkylene chain and a silicon atom, the surface-modifying group surface-modifying the nanodiamond particle.

2. The surface-modified nanodiamond according to claim 1, wherein the polyoxyalkylene chain in the surface-modifying group has a number average molecular weight of 500 or greater as a polyoxyalkylene.

3. The surface-modified nanodiamond according to claim 1, wherein the silicon atom is present as a Si—O bond in the surface-modifying group.

4. The surface-modified nanodiamond according to claim 1, wherein the silicon atom takes a structure in which the silicon atom bonds to the nanodiamond particle with an oxygen atom interposed therebetween.

5. The surface-modified nanodiamond according to claim 1, wherein the polyoxyalkylene chain contains at least one selected from the group consisting of a polyethylene glycol chain, a polypropylene glycol chain, a polytetramethylene glycol chain, and a polybutylene glycol chain.

6. The surface-modified nanodiamond according to claim 1, wherein the surface-modifying group takes a structure in which a terminal of the polyoxyalkylene chain is ended with an aliphatic hydrocarbon group.

7. A surface-modified nanodiamond comprising a nanodiamond particle and a surface-modifying group having a polyoxyalkylene chain and a silicon atom, the surface-modifying group surface-modifying the nanodiamond particle, wherein the surface-modifying group contains a urethane bond.

8. The surface-modified nanodiamond according to claim 1, wherein the polyoxyalkylene chain in the surface-modifying group has a number average molecular weight of 100 or greater as a polyoxyalkylene.

9. The surface-modified nanodiamond according to claim 1, wherein the polyoxyalkylene chain contains oxyalkylene groups having an average degree of polymerization (number average degree of polymerization) of from 2 to 50.

10. The surface-modified nanodiamond according to claim 1, wherein the nanodiamond particle contains a detonation nanodiamond particle.

11. The surface-modified nanodiamond according to claim 1, wherein the surface-modified nanodiamond has a particle size (D50) of 400 nm or less.

12. The surface-modified nanodiamond according to claim 1, wherein the surface-modified nanodiamond has a particle size (D90) of 500 nm or less.

13. A surface-modified nanodiamond composite comprising the surface-modified nanodiamond described in claim 1 and zirconia attached to the surface-modified nanodiamond.

14. The surface-modified nanodiamond as described in claim 13, wherein the zirconia is attached to the surface-modified nanodiamond by physical attachment by bonding or adhesion or by chemical attachment by covalent bonding with the nanodiamond particle or with the surface-modifying groups and/or by bonding by intermolecular forces, hydrogen bonding, or ionic bonding.

15. A nanodiamond dispersion composition comprising a dispersion medium and the surface-modified nanodiamond described in claim 1, the surface-modified nanodiamond being dispersed in the dispersion medium.

16. The nanodiamond dispersion composition according to claim 15, further comprising zirconia.

17. The nanodiamond dispersion composition according to claim 15, wherein said dispersion comprises one or more of water, organic solvents, and ionic liquids.

18. A method of producing the surface-modified nanodiamond described in claim 1, the method comprising modifying by subjecting a nanodiamond particle to a reaction with a polyoxyalkylene chain-containing silane coupling agent.

19. The surface-modified nanodiamond according to claim 7, wherein the urethane bond is present between the silicon atom and the polyoxyalkylene chain in the surface-modifying group.

20. A surface-modified nanodiamond comprising a nanodiamond particle and a surface-modifying group having a polyoxyalkylene chain and a silicon atom, the surface-modifying group surface-modifying the nanodiamond particle, wherein the surface-modifying group is one or more groups selected from the group consisting of groups represented by Formula (1), groups represented by Formula (2), and groups represented by Formula (3):

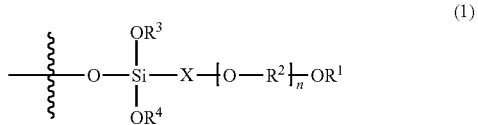

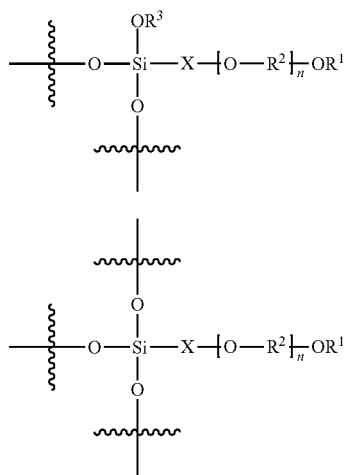

(2)

(3)

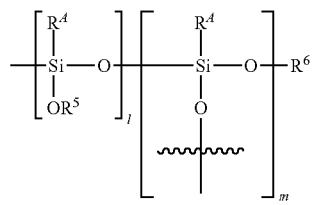

(a)

where in Formulas (1) to (3), $R^1$ represents a hydrogen atom or an aliphatic hydrocarbon group, $R^2$ represents an alkylene group, and when in plural, $R^2$ may each be identical or different, $R^3$ and $R^4$, which may be identical or different, each represent a hydrogen atom, an aliphatic hydrocarbon group having from 1 to 3 carbon atoms, or a group represented by Formula (a), X represents a single bond or a linking group, n represents an integer of 2 or greater, and bonds indicated by a wavy line in Formulas (1) to (3) bond to a surface of the nanodiamond particle:

where in Formula (a), $R^A$ represents $[-X-(O-R^2)n-OR^1]$ of Formulas (1) to (3), $R^5$ and $R^6$, which may be identical or different, each represent a hydrogen atom or an aliphatic hydrocarbon group having from 1 to 3 carbon atoms, l and m, which may be identical or different, each represent an integer of 0 or greater, a bond extending left from a silicon atom bonds to an oxygen atom, a bond indicated by a wavy line in Formula (a) bonds to a surface of the nanodiamond particle, an order of bonding of a constituent unit indicated by l and a constituent unit indicated by m is not limited, and in a case where one of l and m is an integer of 1 or greater while the other is an integer of 2 or greater, a method of bonding for the constituent unit indicated by 1 and the constituent unit indicated by m may be any of random, alternating, and block method.

21. The surface-modified nanodiamond according to claim 20, wherein X contains a urethane bond.

22. A surface-modified nanodiamond composite comprising the surface-modified nanodiamond described in claim 21 and zirconia attached to the surface-modified nanodiamond.

\* \* \* \* \*